(12) United States Patent
Mellon et al.

(10) Patent No.: US 6,702,264 B2
(45) Date of Patent: Mar. 9, 2004

(54) HYDRAULIC ANTIVIBRATION MOUNTING

(75) Inventors: Paul Mellon, La Chapelle du Noyer (FR); Daniel Le Guillant, Chateaudun (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/353,408

(22) Filed: Jan. 29, 2003

(65) Prior Publication Data

US 2003/0146555 A1 Aug. 7, 2003

(30) Foreign Application Priority Data

Feb. 1, 2002  (FR) ............................................. 02 01219

(51) Int. Cl.$^7$ ........................ B60G 13/00; B60G 15/00; B60K 5/12; F16F 9/00; F16F 13/14
(52) U.S. Cl. .............. 267/140.12; 267/219; 267/140.13
(58) Field of Search ............................ 267/140.12, 292, 267/293, 294, 219, 220, 141, 152, 153, 141.4, 141.5, 141.2, 140.13, 140.14; 248/562, 636, 638

(56) References Cited

U.S. PATENT DOCUMENTS 5,711,513 A    1/1998  Bretaudeau et al.
6,022,006 A    2/2000  Bellamy et al.

FOREIGN PATENT DOCUMENTS

EP    001333191 A1  *  8/2003

OTHER PUBLICATIONS

International Search Report; FR 614263 search report dated Nov. 25, 2002.

* cited by examiner

*Primary Examiner*—Douglas C. Butler
(74) *Attorney, Agent, or Firm*—Marshall, Gerstein & Borun LLP

(57) ABSTRACT

A hydraulic antivibration mounting comprises:
  an inner strength member;
  a cage comprising a tubular wall and a flange extending radially outwards from the tubular wall;
  a cylindrical outer strength member in which the cage is received and having a shoulder and a collar, the shoulder defining a channel filled with damping liquid and the collar being crimped directly to the flange; and
  an elastomer body connected to the inner strength member and to the cage and forming a sealing gasket for the channel between the collar and the flange.

6 Claims, 3 Drawing Sheets

HYDRAULIC ANTIVIBRATION MOUNTING

FIELD OF THE INVENTION

The present invention relates to hydraulic antivibration mountings, in particular hydraulic antivibration mountings mounted between an engine and a motor vehicle structure.

More particularly, the invention relates to a hydraulic antivibration mounting comprising:

- a rigid inner strength member extending longitudinally along an axis;
- a rigid cage comprising a tubular wall and a flange, the tubular wall extending between two axial ends and surrounding the inner strength member, and the flange extending radially outwards front the tubular wall at one of its axial ends;
- a cylindrical outer strength member extending likewise between two axial ends, the cage being received therein and the outer strength member having a shoulder and a collar at one of its axial ends, the shoulder co-operating with the flange and the tubular wall of the cage to define a narrow channel extending around a circular arc centered on the axis, and the collar extending from the shoulder perpendicularly to the axis;
- an elastomer body connected to the inner strength member and to the cage, covering at least a fraction of the surface of the tubular wall and of the flange of the cage facing the outer strength member, said elastomer body being shaped to close the channel in leaktight manner and to co-operate with the outer strength member to form at least two pockets that communicate with each via the channel, the two pockets and the channel being filled with a damping liquid, and one of the pockets being deformable when the inner strength member and the cage are subjected to radial displacement relative to each other; and
- a plate secured to at least one element selected from the cage and the outer strength member, the plate extending perpendicularly to the axis and including fixing means for fixing the mounting to a part external to the mounting.

BACKGROUND OF THE INVENTION

As shown in FIG. 1, mountings of this type are already known in which the plate 17 rests on the flange 7 and encloses the cage 3 in the outer strength member 5, and in which the collar 22 extends radially towards the outside of the mounting, substantially on the same surface as the plate 17 and which is crimped to the edges of the plate 17.

Mountings are also known of the kind shown in FIG. 2 in which the outer strength member 5 has a collar 22 extending from the shoulder 21 towards the inner strength member 2 so as to enclose the cage 3 in the outer strength member 5, and in which the plate 17 is welded to the outside wall of the outer strength member 5.

Those mountings comprise two strength members, a cage, and a plate. The engagement in the outer strength member of the assembly constituted by the inner strength member, the cage, and the elastomer body, and the crimping or welding of the outer strength member to the plate need to be performed as two distinct successive operations.

Such mountings thus present the drawbacks of relatively high weight and manufacturing cost and of needing to be assembled in two operations, thereby requiring tooling that is relatively complex.

OBJECTS AND SUMMARY OF THE INVENTION

A particular object of the present invention is to mitigate those drawbacks.

To this end, according to the invention, in a mounting of the kind in question, the collar extends radially outwards from the shoulder and includes at least one surface portion facing the flange with a thickness of the elastomer body being interposed between the collar and the flange, the collar is fixed directly to the flange by crimping, and at least one of the elements selected from the collar and the flange constitutes the plate.

By means of these dispositions, the plate and the collar or the flange constitute a single piece only, thereby making it possible to reduce the number of parts in a mounting of the invention compared with prior art mountings, and thus to simplify manufacture thereof by reducing the number of assembly operations. Consequently, this makes it possible to reduce the manufacturing cost and the weight of this type of mounting.

In preferred embodiments of the invention, recourse may optionally also be had to one or more of the following dispositions:

- one of the elements selected from the collar and the flange has at least one crimping orifice with a countersunk hole to form means for retaining a crimping bead formed out of the same material as the other one of said elements;
- the plate is constituted by the flange and extends in a plane substantially perpendicular to the axis;
- the outer strength member is made of a material selected from: aluminum; steel; and a plastics material;
- the shoulder is made by stamping the outer strength member; and
- the shoulder is made by molding the outer strength member.

BRIEF DESCRIPTION OF THE DRAWINGS

Other aspects, objects, and advantages of the invention appear on reading the description of an embodiment thereof.

The invention will also be better understood with the help of the drawings, in which.

MORE DETAILED DESCRIPTION

Figure 1:
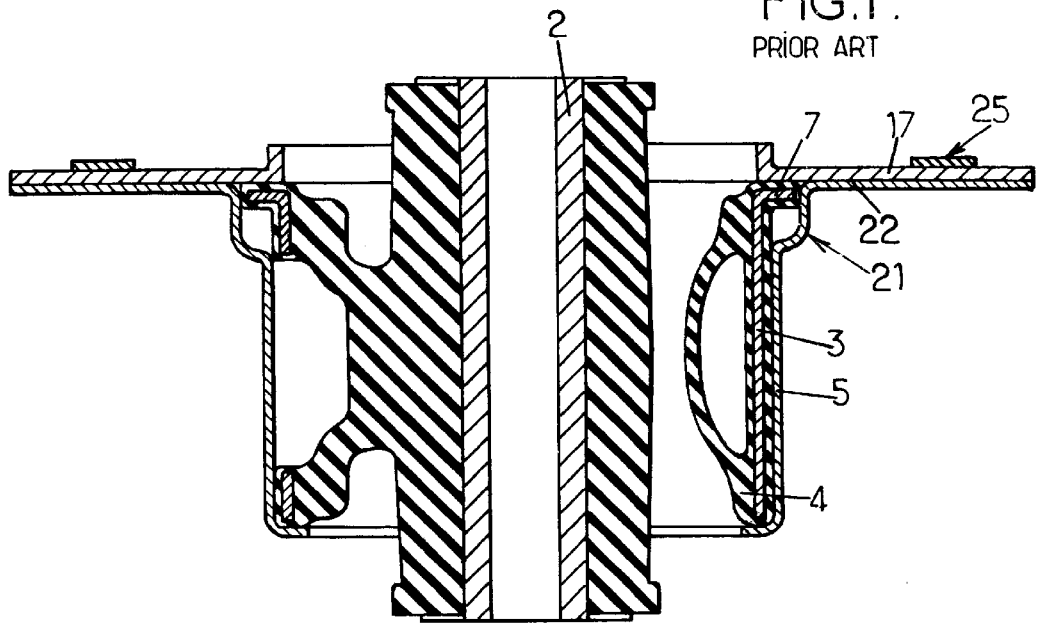
FIG. 1 is a diagrammatic axial section of a prior art mounting.
Figure 2:
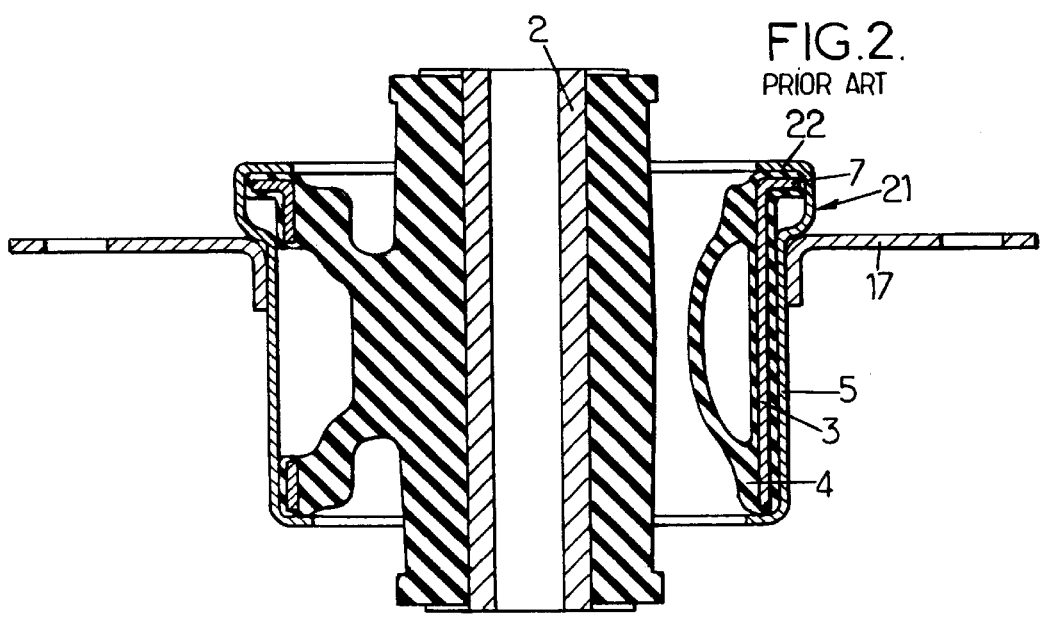
FIG. 2 is a diagrammatic axial section analogous to that of FIG. 1 showing another prior art mounting.
Figure 3:
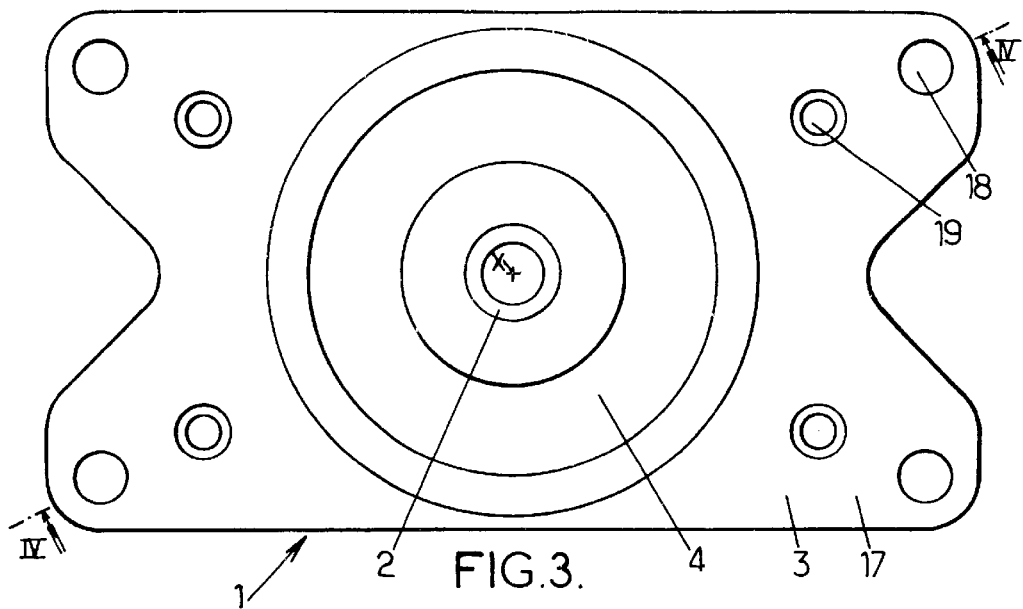
FIG. 3 is a diagrammatic plan view of a mounting in accordance with the present invention.

In the various figures, the same references are used to designate elements that are identical or similar.

An embodiment of the mounting 1 in accordance with the present invention is described below by way of non-limiting example and with reference to FIGS. 1 to 5.

As shown in these figures, the mounting 1 in this embodiment comprises an inner strength member 2, a cage 3, an elastomer body 4, and an outer strength member 5.

The inner strength member 2 is constituted by a rigid tube extending longitudinally along an axis of revolution X.

The cage 3 is made of rigid metal sheet and comprises a tubular wall 6 and a flange 7.

The tubular wall 6 surrounds the inner strength member 2, being coaxial thereabout. The tubular wall 6 extends parallel to the axis X between two axial ends 8 and 9.

The tubular wall 6 has two windows 10 and 11 that are substantially diametrically opposite about the axis X. The presence of the windows 10 and 11 makes it easier to mold the elastomer body 4 on the cage 3.

Figure 4:
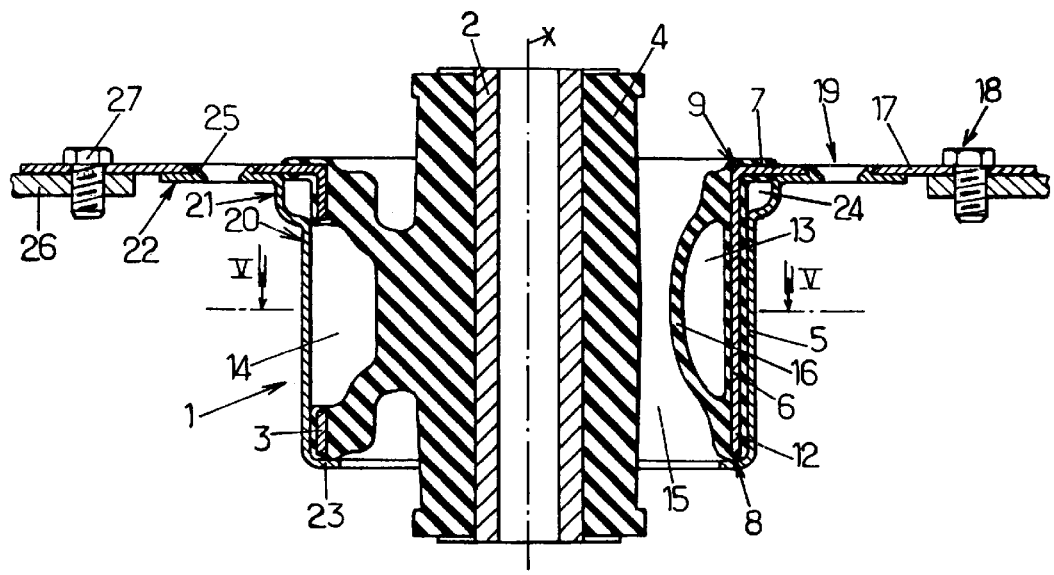
FIG. 4 is a diagrammatic axial section view analogous to those of FIGS. 1 and 2 showing the FIG. 3 mounting.
Figure 5:
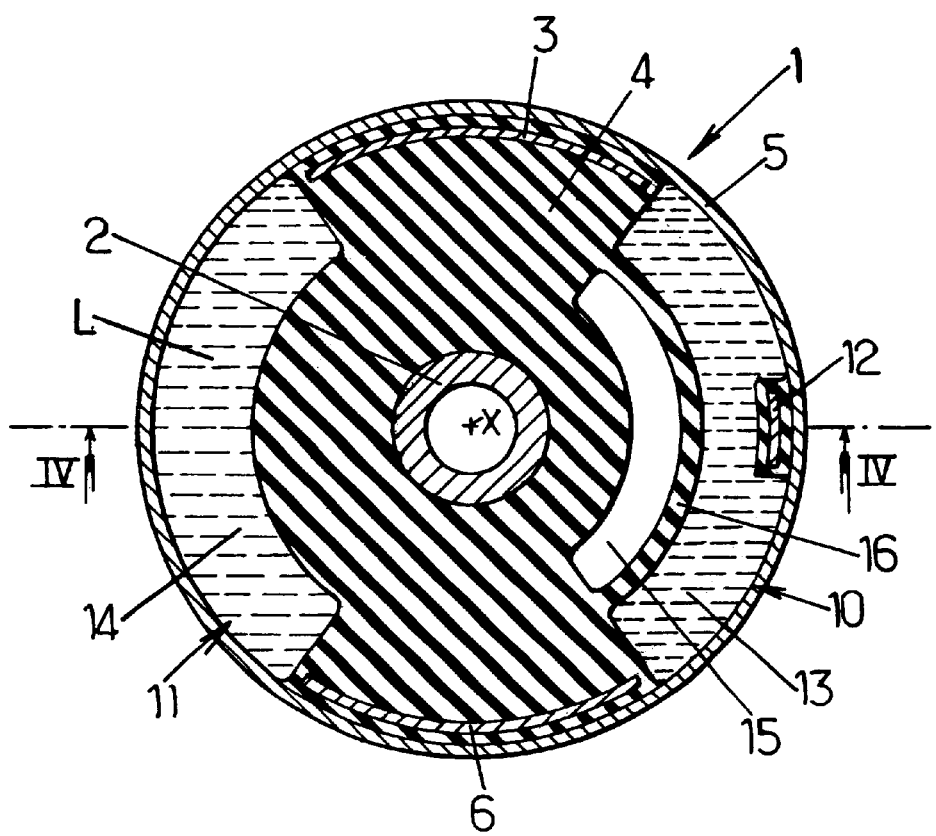
FIG. 5 is a diagrammatic cross-section view of the mounting shown in FIGS. 3 and 4.

The window 10 on the right in FIGS. 4 and 5 includes reinforcement 12 extending longitudinally parallel to the axis X substantially between the respective middles of two edges of the window 10 that extend perpendicularly to the axis X. This reinforcement 12 is approximately 10 millimeters (mm) wide.

The flange 7 extends radially towards the outside of the mounting 1 from the axial end 9. The axial end 9 is continuously connected with the flange 7.

The flange 7 is extended in a plane perpendicular to the axis X so as to form a plate 17. The flange 7 and the plate 17 are in fact constituted as a single piece. The flange 7 corresponds to that portion of said piece which is covered by the elastomer body 4, while the plate 17 corresponds to the remaining portion of said piece.

The plate 17 is substantially rectangular in shape and has means for fixing the mounting 1 to a part 26 external to the mounting 1, for example an engine. These fixing means appear in the plate 17 in the form of holes 18 through which bolts 27 are passed, for example.

The plate 17 is pierced by four crimping orifices 19. Each crimping orifice 19 is circular and, in a section perpendicular to the plane of the plate 17, it presents countersinking that flares so as to be more widely open in the top face of the plate 17, i.e. the face of the plate that corresponds to going from the axial end 8 towards the axial end 9.

The elastomer body 4 surrounds the inner strength member 2 and envelops the tubular wall 6 and the flange 7 of the cage 3. The elastomer body 4 connects the inner strength member 2 to the cage 3 and forms two pockets 13 and 14 in register with the windows 10 and 11, respectively.

The pocket 13, i.e. the pocket corresponding to the window 10 having the reinforcement 12 (to the right in FIG. 4) presents an axial section that is U-shaped, being open radially towards the outside of the mounting 1 and having its web separated from the inner strength member 2 by a cavity 15 and a wall 16.

The pocket 14 has an axial section that is U-shaped or V-shaped being open radially towards the outside of the mounting 1 and its web is connected to the inner strength member 2 via the elastomer body 4.

The outer strength member 5 has a cylindrical portion 20 that is circularly symmetrical about the axis X, a shoulder 21, and a collar 22. The outer strength member 5 may be made of steel, aluminum, or plastics material, for example. When the outer strength member 5 is made by molding a plastics material, its function is essentially to close off the pockets 13 and 14.

The cylindrical portion 20 closely surrounds the tubular wall 6 of the cage 3, a thin layer of the elastomer body 4 being interposed between them. The cylindrical portion 20 continues towards the bottom portion of the mounting 1, i.e. its axial end 8, in the form of a rim 23. This rim 23 extends radially from the cylindrical portion 20 towards the axis X. The elastomer body 4 interposed between the axial end 8 of the tubular wall 6 and said rim 23 constitutes an axial sealing gasket.

The cylindrical portion 20 closes the windows 10 and 11 so as to close the pockets 13 and 14, the elastomer body 4 acting as a sealing gasket around these windows 10 and 11.

The cylindrical portion 20 continues towards the top end of the mounting 1, i.e. beside the axial end 9 of the tubular wall 6, in the form of the shoulder 21. When the outer strength member 5 is made of steel or of aluminum, the shoulder 21 is made by stamping the outer strength member 5 or by casting. When the outer strength member 5 is made by molding a plastics material, the shoulder 21 is formed during molding. The shoulder 21 extends radially towards the outside of the mounting 1.

The shoulder 21 co-operates with the top portion of the tubular wall 6 situated close to the axial end 9 and the flange 7 to define a channel 24. The channel 24 is narrow and interconnects the pockets 13 and 14, extending along a circular arc centered on the axis X. Each of the pockets 13 and 14 is connected with the channel 24 through the corresponding window 10 or 11 and via respective bent passages formed in the outer strength member 5 (not visible in the section planes shown).

The pockets 13 and 14 and the channel 24 are filled with a damping liquid L. This liquid moves from one pocket to the other via the channel 24. The pocket 13 is suitable for deforming because of the flexibility of the wall 16 when the inner strength member 2 is displaced relative to the cage 3.

The shoulder 21 continues radially towards the outside of the mounting 1 in the form of a collar 22. The collar 22 has four crimping beads 25 in register with the crimping orifices 19. The wall constituting each bead 25 is folded down against the countersinking of the corresponding crimping orifice 19. The outer strength member 5 is thus held against the plate 17. Each bead 25 is shaped in such a manner as to avoid projecting beyond the top face of the plate 17, after crimping.

The mounting 1 is manufactured in a single operation during which the inner strength member 2 and the cage 3 is engaged by force into the top face (beside the shoulder 21) of the outer strength member 5 and the crimping beads 25 are crimped down in the corresponding crimping orifices 19. When the outer strength member 5 is made of plastics material, it is advantageously held against the plate 17 by snap-fastening.

A portion of the elastomer body 4 is compressed between the flange 7 and the collar 22, thus forming another axial sealing gasket.

Numerous variant embodiments of the mounting 1 of the invention as described above can be devised. Thus, countersinking can be performed in the collar 22 instead of in the plate 17, in which case the crimping bead 25 should be formed on the plate 17, thus reversing the direction of crimping relative with that described above. Similarly, the collar 22 can be crimped to the edges of the plate 17 either as well as or instead of the crimping performed in the above-described crimping orifices 19.

What is claimed is:

1. A hydraulic antivibration mounting comprising:

a rigid inner strength member extending longitudinally along an axis;

a rigid cage comprising a tubular wall and a flange, the tubular wall extending between two axial ends and surrounding the inner strength member, and the flange extending radially outwards from the tubular wall at one of its axial ends;

a cylindrical outer strength member extending likewise between two axial ends, the cage being received therein and the outer strength member having a shoulder and a collar at one of its axial ends, the shoulder co-operating with the flange and the tubular wall of the cage to define a narrow channel extending around a circular arc centered on the axis, and the collar extending from the shoulder perpendicularly to the axis;

an elastomer body connected to the inner strength member and to the cage, covering at least a fraction of the surface of the tubular wall and of the flange of the cage facing the outer strength member, said elastomer body being shaped to close the channel in leaktight manner and to co-operate with the outer strength member to form at least two pockets that communicate with each via the channel, the two pockets and the channel being filled with a damping liquid, and one of the pockets being deformable when the inner strength member and the cage are subjected to radial displacement relative to each other; and a plate secured to at least one element selected from the cage and the outer strength member, the plate extending perpendicularly to the axis and including fixing means for fixing the mounting to a part external to the mounting, wherein:
  the collar extends radially outwards from the shoulder and includes at least one surface portion facing the flange with a thickness of the elastomer body being interposed between the collar and the flange;
  the collar is fixed directly to the flange by crimping; and
  at least one of the elements selected from the collar and the flange constitutes the plate.

2. A mounting according to claim 1, in which one of the elements selected from the collar and the flange has at least one crimping orifice with a countersunk hole to form means for retaining a crimping bead formed out of the same material as the other one of said elements.

3. A mounting according to claim 1, in which the plate is constituted by the flange and extends in a plane substantially perpendicular to the axis.

4. A mounting according to claim 1, in which the outer strength member is made of a material selected from: aluminum; steel; and a plastics material.

5. A mounting according to claim 1, in which the shoulder is made by stamping the outer strength member.

6. A mounting according to claim 1, in which the shoulder is made by molding the outer strength member.

* * * * *

UNITED STATES PATENT AND TRADEMARK OFFICE
CERTIFICATE OF CORRECTION

PATENT NO.   : 6,702,264 B2
DATED        : March 9, 2004
INVENTOR(S)  : Paul Mellon et al.

It is certified that error appears in the above-identified patent and that said Letters Patent is hereby corrected as shown below:

Column 5,
Line 6, please delete "are" and insert -- arc --.

Signed and Sealed this

Twenty-second Day of June, 2004

JON W. DUDAS
*Acting Director of the United States Patent and Trademark Office*